United States Patent [19]

Schram

[11] Patent Number: 5,121,840

[45] Date of Patent: Jun. 16, 1992

[54] INFLATABLE BODY WITH A VALVE

[76] Inventor: Henk Schram, Zuideinde 161, NL-1551 EE Westzaan, Netherlands

[21] Appl. No.: 588,197

[22] Filed: Sep. 26, 1990

[30] Foreign Application Priority Data

Sep. 29, 1989 [NL] Netherlands ............ 8902430

[51] Int. Cl.⁵ ............... B65D 81/08; F16K 15/14
[52] U.S. Cl. ................. 206/522; 137/223; 137/859; 220/209; 383/3
[58] Field of Search ......... 137/859, 223; 206/522; 383/3, 103; 220/203, 208, 209

[56] References Cited

U.S. PATENT DOCUMENTS

| 886,316 | 4/1908 | Dunn | 137/223 |
|---|---|---|---|
| 1,372,878 | 3/1921 | Harder . | |
| 1,423,873 | 7/1922 | Newsom et al. . | |
| 1,910,961 | 5/1933 | Perry | 137/859 X |
| 2,604,297 | 7/1952 | Winstead | 137/859 X |
| 2,751,953 | 6/1956 | Grimm | 383/3 |
| 2,942,614 | 6/1960 | Lardner | 137/859 X |
| 2,949,927 | 8/1960 | Mackal | 137/859 X |
| 3,085,591 | 4/1963 | Schweider | 220/209 X |
| 3,595,467 | 7/1971 | Goglio | 220/209 X |
| 3,913,614 | 10/1975 | Speck | 220/209 X |
| 3,949,934 | 4/1976 | Goglio | 220/209 X |
| 4,966,185 | 10/1990 | Schram | 137/223 |

FOREIGN PATENT DOCUMENTS

| 0324519 | 1/1989 | European Pat. Off. . |
|---|---|---|
| 0861654 | 11/1952 | Fed. Rep. of Germany . |
| 3508777 | 11/1985 | Fed. Rep. of Germany . |
| 2578943 | 9/1986 | France . |

Primary Examiner—Bryon P. Gehman
Attorney, Agent, or Firm—Webb, Burden, Ziesenheim & Webb

[57] ABSTRACT

The present invention relates to valves for fluid inflatable bodies and packaging with such valves. The valve has an outer plate, a flat sealing ring and an inner plate with a valve body. The valve body seating and outer plate seating which contact the sealing rim have sharp peripheral ribs which are coaxial with the fluid inlet and of different diameters.

16 Claims, 3 Drawing Sheets

INFLATABLE BODY WITH A VALVE

The present invention relates to a medium-inflatable body provided with an opening that can be closed off with a valve the value comprising:

an outer plate with a medium inlet which is arranged on the body around the opening such that the medium inlet lies opposite the opening; and an inner plate provided with a valve body which is connected to the inner plate via laterally extending wings, wherein medium passages lie between the wings, and which is provided with a central valve body portion wherewith the medium inlet in the outer plate is closable with enclosing of a flat sealing ring.

Such a valve is described in EP-A-0.324.519.

The valve described therein functions excellently if the body is inflated with gas. A body filled with liquid cannot however be reliably closed with such a valve, particularly if the valve is positioned in a body portion which, after filling of the body, is curved in at least one or more directions.

The object of this invention is to improve this known valve such that bodies inflated or filled with either gas or liquid are reliably closed irrespective of the position where the valve is arranged in the body.

This is achieved according to the invention by providing the valve body seating and the outer plate seating, which come into contact with the sealing ring, with a sharp peripheral rib of mutually differing diameter located coaxially around the medium inlet.

It has been found that through use of both sharp peripheral ribs a good sealing is obtained with the valve in closed position if these ribs are each forced at least about 10% into the sealing ring. Because the diameters of both peripheral ribs differ, the flat sealing ring assumes, in closed position of the valve, a somewhat S-shaped form in radial direction.

A particularly well functioning valve is obtained if the diameter of the peripheral rib of the valve body seating is greater than that of the outer plate seating.

If the body is inflated with a medium having an overpressure (for example, 8 bar), a deforming of the sealing ring occurs as a consequence of the through-flowing medium, which can lead to an undesired displacing of the ring. Such deforming can be limited and undesired displacement avoided if the wings are provided with positioning studs for the sealing ring. In order to ensure that the wings remain sufficiently flexible and resilient it is further recommended that alternate wings are provided with a positioning stud.

An optimally balanced valve is obtained if the wings are arranged diametrically and in rotational symmetry around the valve body.

Finally, the invention relates to a packaging provided with a body with a valve according to the invention.

These and other features of the inflatable body according to the invention will be described hereinafter in more detail in the description of an embodiment, to which the invention is not in any way limited, illustrated in the drawings.

Figure 1:
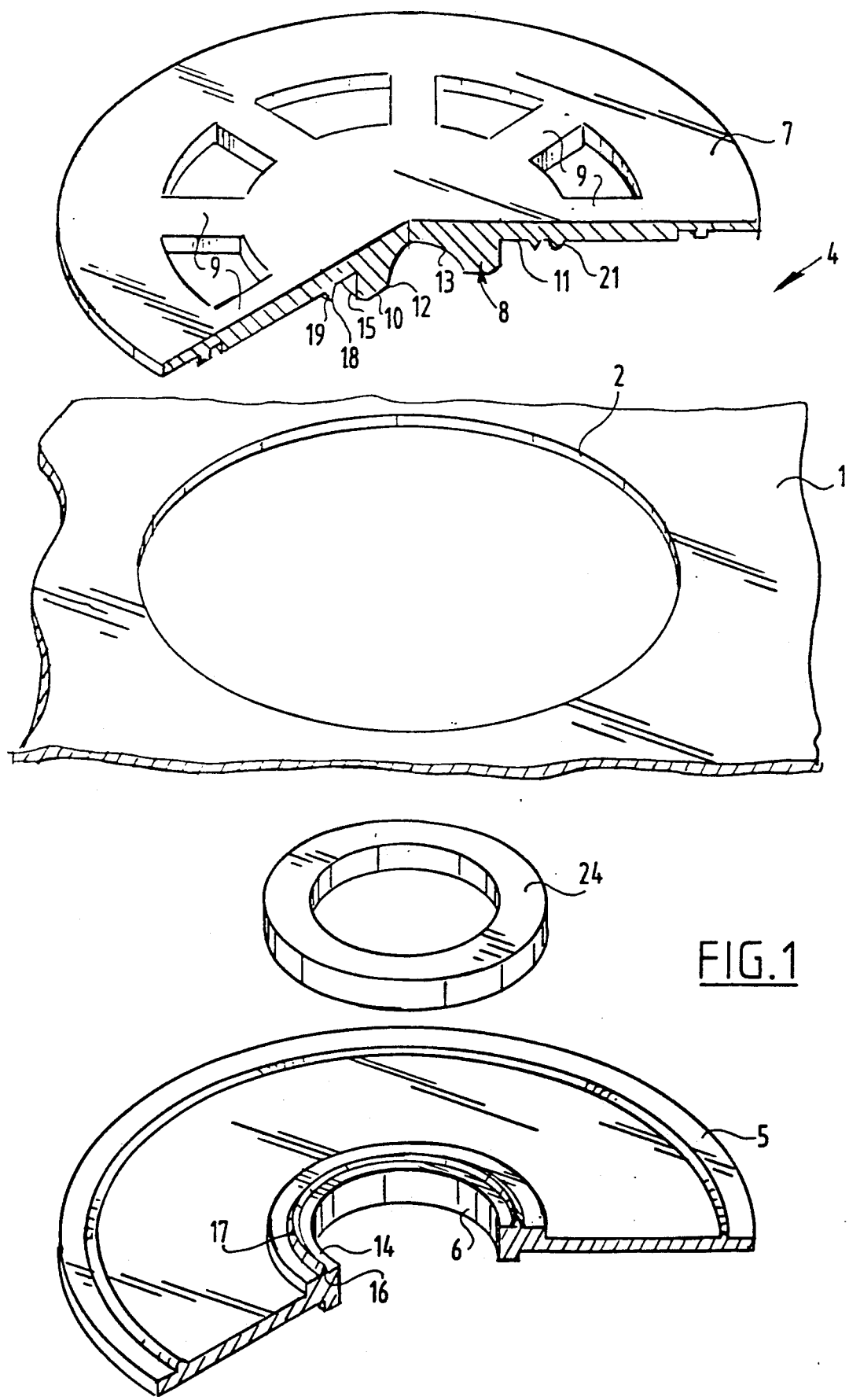
FIG. 1 shows an exploded and partly broken away view of a valve according to the invention.
Figure 2:
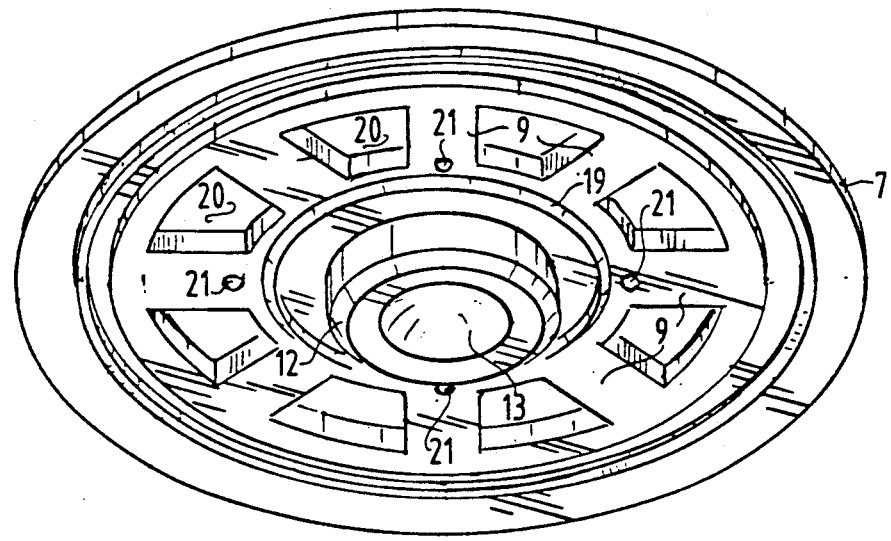
FIG. 2 is a bottom view of the inner plate shown in FIG. 1.

FIG. 1 shows a body 1 for filling with medium 3 which is provided with an opening 2 that can be closed with a valve 4 according to the invention.

The valve 4 comprises a flexible outer plate 5 that is arranged around the opening 2 such that a medium inlet 6 lies opposite opening 2. The outer plate 5 is adhered to the body 1 for example with adhesive or by means of welding.

Adhered on the inside to the body is a flexible inner plate 7. This latter plate is provided with a valve body 8 joined via laterally extending wings 9 to the inner plate 7 and forms an entity therewith. The wings are arranged diametrically and in rotational symmetry around a central valve body portion 10 which is provided on its side 11 facing the outer plate 5 with a guide member 12. Guide member 12 which can extend into the medium inlet 6 in the outer plate 5. The guide member 12 is further provided with a tool seating 13 so that, if required, the valve body 8 can be lifted and medium present in the body 1 can be drained off.

Figure 3A:
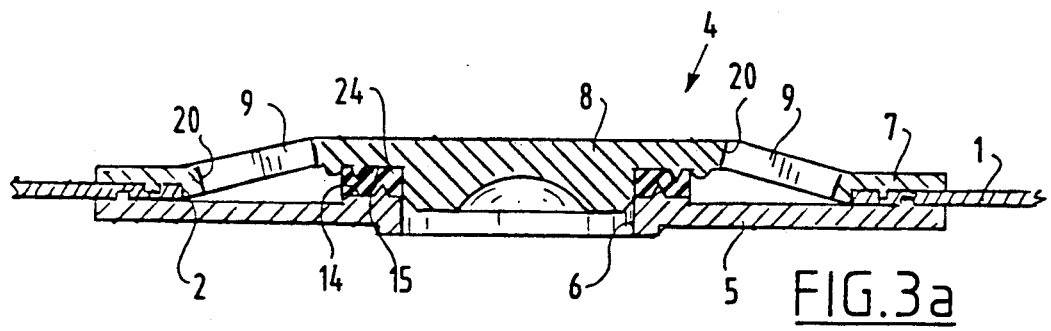
FIG. 3 shows a section through the valve of FIG. 1 which is arranged in a body after filling with medium (FIG. 3a) and during filling with medium (FIG. 3b)
Figure 3B:
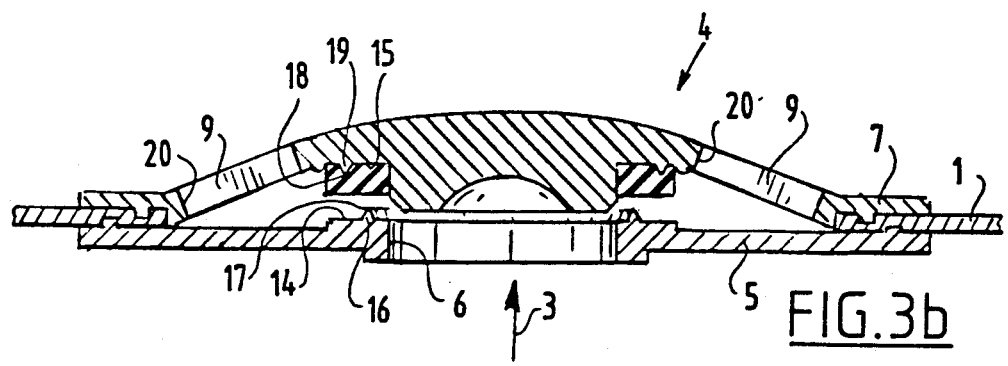

A flat sealing ring 24 is clampingly attached round the guide member 12 and co-acts with an outer plate seating 14 and a valve body seating 15. The integrated inner plate 7-valve body 8 thus lies in a curved and tensioned position on the outer plate 5 when the valve 4 is closed, as shown in FIG. 3a.

The outer plate seating 14 is provided with a rib 16 with a sharp edge 17 arranged coaxially around the medium inlet 6. In the same manner the valve body seating 15 is provided with a coaxial rib 19 furnished with a sharp edge 18. The diameters of the ribs 16 and 19 differ. Preferably the diameter of the rib 19 is greater than that of rib 16. The diameter of rib 19 is, for example, 9 mm, of rib 16, 8 mm, and that of the flat sealing ring 24, 10 mm.

Thus when the valve 4 in a closed position (FIG. 3a) the sealing ring 24 is substantially s-shaped in the radial direction and passage by medium in radial direction between the sealing ring 24 on the one side and the outer plate 5 or inner plate 7 on the other is substantially wholly prevented.

In order to prevent the sealing ring 24 detaching from the guide member 12 during filling of the body 1 with medium 3, when the valve body 8 is raised from the outer plate 5 and medium 3 can flow in via the medium inlet 6 and the medium passages 20 between the wings 9, positioning studs 21 are arranged on the wings 9, preferably on alternate wings 9 so that the wings 9 do not become too rigid.

Figure 4A:
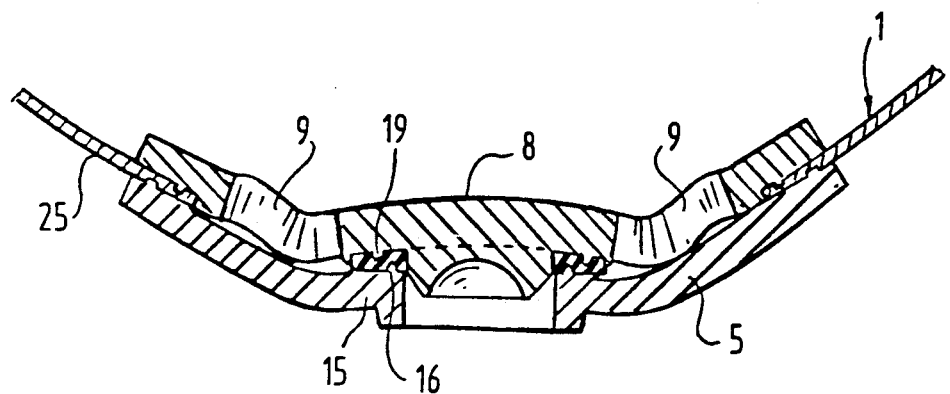
FIGS. 4a and 4b show a section similar to FIG. 3a wherein the valve is located respectively in a convex and a concave portion of the body.
Figure 4B:
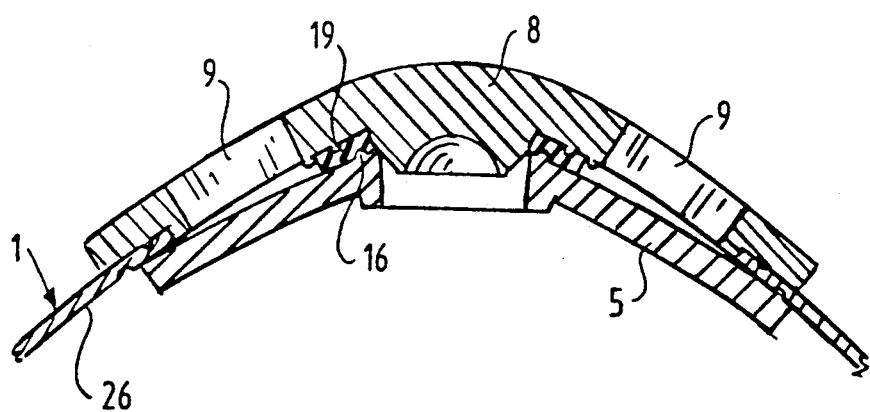

FIGS. 4a and 4b show clearly the multiple function of the wings if the valve according to the invention is situated in a curved portion of the body 1. In the case of where the valve is situated on a convex body portion 25 the wings 9 press the valve body 8 onto the valve body seating 15. In the case of where the valve is situated on a saddle-shaped portion of the body 1, a number of the wings 9 act as pressure elements and a further number as pulling elements, depending on the position of these wings in the saddle-shaped portion.

Suitable mediums which can be used include gases such as air, carbon dioxide, nitrogen, oxygen, and liquids such as liquid soap (shampoo), liquid chlorine, wine, lemonades and thin oils can be used as mediums.

The body 1 can consist of a relatively medium-tight material such as polyethylene foil for use, for instance, in cardboard products.

I claim:

1. A medium-inflatable body, comprising:
   a body provided with an opening that can be closed off with a valve, and a valve provided in said opening to close off said opening, said valve comprising:
   an outer plate having an outer plate seating and a medium inlet which is arranged on the body around the opening such that the medium inlet lies opposite the opening;
   an inner plate which defines a central hole and is in sealing contact with the inner surface of said body around the opening;
   a central valve body portion within the central hole and connected to the inner plate by laterally extending wings which define medium passages between adjacent wings, said valve body having a valve body seating;
   a flat sealing ring positioned between the central valve body portion and the medium inlet of the outer plate; and
   sharp peripheral ribs located coaxially around the medium inlet on the valve body seating and the outer plate seating which come into contact with the sealing ring, the ribs being of different diameters;
   wherein said wings are provided with positioning studs for the sealing ring.

2. A medium-inflatable body, comprising:
   a body provided with an opening that can be closed off with a valve, and a valve provided inset opening to close off said opening, said valve comprising:
   an outer plate having an outer plate seating and a medium inlet which is arranged on the body around the opening such that the medium inlet lies opposite the opening;
   an inner plate which defines a central hole and is in sealing contact with the inner surface of said body around the opening;
   a central valve body portion within the central hole and connected to the inner plate by laterally extending wings which define medium passages between adjacent wings, said valve body having a valve body seating;
   a flat sealing ring positioned between the central valve body portion and the medium inlet of the outer plate; and
   sharp peripheral ribs located coaxially around the medium inlet on the valve body seating and the outer plate seating which come into contact with the sealing ring, the ribs being of different diameters;
   wherein the diameter of one of said sharp peripheral ribs that is located on said valve body seating is greater than one of said sharp peripheral ribs that is located on said outer plate seating.

3. A medium-inflatable body as claimed in claim 2, wherein said wings are provided with positioning studs for the sealing ring.

4. A medium-inflatable body as claimed in claim 2, wherein the wings are arranged diametrically and in rotational symmetry around the valve body.

5. A medium-inflatable body as claimed in claim 2, wherein the wings are arranged diametrically and in rotational symmetry around the valve body.

6. A medium-inflatable body of claim 2 wherein the body comprises a packaging.

7. A medium-inflatable body as claimed in claim 1, wherein alternate wings are provided with a positioning stud.

8. A medium-inflatable body as claimed in claim 7, wherein the wings are arranged diametrically and in rotational symmetry around the valve body.

9. A medium-inflatable body of claim 7 wherein the body comprises a packaging.

10. A medium-inflatable body as claimed in claim 1, wherein the wings are arranged diametrically and in rotational symmetry around the valve body.

11. A medium-inflatable body of claim 10 wherein the body comprises a packaging.

12. A medium-inflatable body of claim 1 wherein the body comprises a packaging.

13. A valve for a medium-inflatable body comprising:
    an outer plate having an outer plate seating and a medium inlet which is arranged on said body around an opening of said body such that the medium inlet lies opposite said opening;
    an inner plate which defines a central hole and is in sealing contact with the inner surface of said body around said opening;
    a central valve body portion within the central hole and connected to the inner plate by laterally extending wings which define medium passages between adjacent wings, said central valve body having a valve body seating;
    a flat sealing ring positioned between said central valve body portion and the medium inlet of the outer plate; and
    sharp peripheral ribs located coaxially around said medium inlet on the valve body seating and said outer plate seating which come in contact with said sealing ring, the ribs being of different diameters;
    wherein said wings are provided with positioning studs for the sealing ring.

14. A valve as claimed in claim 13 wherein the diameter of a peripheral rib of the valve body seating is greater than that of a peripheral rib of the outer plate seating.

15. A valve as claimed in claim 14 wherein alternate wings are provided with said positioning stud.

16. A valve as claimed in claim 14 wherein the wings are arranged diametrically and in rotational symmetry around the valve body.

* * * * *

UNITED STATES PATENT AND TRADEMARK OFFICE
CERTIFICATE OF CORRECTION

PATENT NO. : 5,121,840
DATED : June 16, 1992
INVENTOR(S) : Henk Schram

It is certified that error appears in the above-identified patent and that said Letters Patent is hereby corrected as shown below:

Cover Page:

Item [56], under References Cited U.S. PATENT DOCUMENTS
  "3,085,591 4/1963 Schweider ... 220/209 X" should read
  --3,085,591 4/1963 Schneider ... 220/209 X--.
and
under FOREIGN PATENT DOCUMENTS "0324519 1/1989 European Pat. Off." should read --0324519 7/1989 European Pat. Off.--.

Claim 7, line 14, column 4, "1" should read --17--.

Claim 10, line 22, column 4, "1" should read --17--.

Claim 11, line 25, column 4, "1" should read --2--.

Claim 12, line 27, column 4, "1" should read --4--.

Claim 15, line 55, column 4, "14" should read --13--.

Claim 15, line 56, column 4, "stud" should read --studs--.

Claim 16, line 54, column 4, "14" should read --13--.

Signed and Sealed this

Twenty-eighth Day of June, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,121,840
DATED : June 16, 1992
INVENTOR(S) : Henk Schram

It is certified that error appears in the above-indentified patent and that said Letters Patent is hereby corrected as shown below:

Title page, item [56], under References Cited, U.S. Patent Patent Documents, "3,085,591 4/1963 Schweider .... 220/209 X" should read --3,085,591 4/1963 Schneider ....220/209 X --.

Title page, item [56], under References Cited, Foreign Patent Documents, "0324519 1/1989 European Pat.Off." should read --0324519 7/1989 European Pat. Off. --.

Claim 15, line 55, Column 4 "14" should read --13 --.

Signed and Sealed this

Tenth Day of January, 1995

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,121,840
DATED : June 16, 1992
INVENTOR(S) : Henk Schram

It is certified that error appears in the above-indentified patent and that said Letters Patent is hereby corrected as shown below:

Title page, item [56], under References Cited, U.S. PATENT DOCUMENTS, "3,085,591  4/1963  Schweider ... 220/209 X" should read --3,085,591 4/1963 Schneider ... 220/209 X--.

Title page, item [56], under References Cited, FOREIGN PATENT DOCUMENTS, "0324519 1/1989 European Pat. Off." should read --0324519 7/1989 European Pat. Off.--.

Claim 15 Line 56 Column 4 "stud" should read --studs--.

Claim 16 Line 57 Column 4 "14" should read --13--.

This Certificate supersedes Certificates of Correction issued June 28, 1994 and January 10, 1995.

Signed and Sealed this

Thirteenth Day of June, 1995

Attest:

BRUCE LEHMAN

Attesting Officer        Commissioner of Patents and Trademarks